UNITED STATES PATENT OFFICE.

WILLOW WEIR HUGHES, OF LOS ANGELES, CALIFORNIA.

FOOD-PRESERVATIVE COMPOUND.

No. 868,566.   Specification of Letters Patent.   Patented Oct. 15, 1907.

Application filed May 21, 1907. Serial No. 374,882.

*To all whom it may concern:*

Be it known that I, WILLOW WEIR HUGHES, a citizen of the United States, residing at Los Angeles, in the county of Los Angeles and State of California, have invented a new and useful Food-Preservative Compound, of which the following is a specification.

This invention relates to a food preservative to be applied to flesh and vegetable foods for preventing deterioration of the various tissues by applying to such foods, especially flesh foods, certain ascertained chemical preparations which during life will build up the cellular structure of the deteriorated parts.

The twelve salts hereinafter mentioned are each triturated with sugar of milk to the potency or strength in which they are found on sale. The attenuation being from about one-thirtieth to one-sixtieth of the pure salt. The diluted salts are then thoroughly mixed in about the following proportions, viz:

| | |
|---|---|
| Potassium chlorid | 30 parts. |
| Potassium phosphate | 25 " |
| Potassium sulfate | 2 " |
| Iron phosphate | 10 " |
| Sodium phosphate | 7 " |
| Magnesium phosphate | 2 " |
| Calcium phosphate | 2 " |
| Calcium sulfate | 2 " |
| Calcium fluorid | 4 " |
| Sodium chlorid | 4 " |
| Sodium sulfate | 2 " |
| Silica | 4 " |

These substances are in the form of powder and after thorough mixing are in condition for application to meats, fruits and vegetables by dusting or otherwise applying the preservative over their surfaces. If preferred a watery solution may be made of the preservative and the articles immersed in the fluid, but the powdered form is preferred. Under certain conditions it may be of advantage to administer the preparation to animals hypodermically or by way of the mouth previous to killing them for the purpose of improving their condition.

The proportions of the ingredients may be changed within certain limitations depending on the chemical constitution of the food product to be treated. Of the many elements known to chemists, but comparatively few of them are found in any large quantity in animal tissue. Analysis shows that oxygen, hydrogen, nitrogen and carbon however are found in very large quantities in every tissue and make up the larger part of their structure. Forming a part of the number found in smaller quantities, those mentioned above are among the most important and play a very useful part in restoring deranged tissues to their normal condition and hence are chosen as the ingredients of the improved preserving compound.

Having thus described the invention, what is claimed is:—

1. A food preservative compound comprising the phosphate of lime, iron, potash, soda and magnesia the chlorids of potash and soda, the sulfates of lime, soda and potash, fluorid of lime, and silica mixed together in the proportions found in animal tissues, with a base of sugar of milk.

2. A food preservative compound comprising the phosphates of lime, iron, potash, soda and magnesia, the chlorids of potash and soda, the sulfates of lime, soda and potash, fluorid of lime, and silica mixed in about the proportion specified.

In testimony that I claim the foregoing as my own, I have hereto affixed my signature in the presence of two witnesses.

WILLOW WEIR HUGHES.

Witnesses:
FRANK HUGHES,
H. G. SHAUG.